US012749147B2

(12) United States Patent
Dupeyron

(10) Patent No.: US 12,749,147 B2
(45) Date of Patent: Sep. 29, 2026

(54) GENERATION SUPER SAMPLING

(71) Applicant: Sony Interactive Entertainment Inc., Tokyo (JP)

(72) Inventor: Denis Dupeyron, Broomfield, CO (US)

(73) Assignee: Sony Interactive Entertainment Inc., Tokyo (JP)

( * ) Notice: Subject to any disclaimer, the term of this patent is extended or adjusted under 35 U.S.C. 154(b) by 213 days.

(21) Appl. No.: 18/393,547

(22) Filed: Dec. 21, 2023

(65) Prior Publication Data

US 2025/0209568 A1 Jun. 26, 2025

(51) Int. Cl.
*G06V 10/00* (2022.01)
*G06F 3/0354* (2013.01)
*G06T 3/4046* (2024.01)

(52) U.S. Cl.
CPC .......... *G06T 3/4046* (2013.01); *G06F 3/0354* (2013.01)

(58) Field of Classification Search
CPC ......... G06T 3/4038; G06T 2207/20212; G06T 2207/20221; G06T 2207/20224; G06T 1/0021; G06T 1/0028; G06T 1/0035; G06T 1/0042; G06T 1/005; G06T 1/0057; G06T 1/0064; G06T 1/0071; G06T 1/0085; G06T 1/0051; G06T 1/0061
See application file for complete search history.

(56) References Cited

U.S. PATENT DOCUMENTS 5,231,484 A 7/1993 Gonzales et al.
5,377,051 A 12/1994 Lane et al.
6,463,101 B1 10/2002 Koto
6,700,932 B2 3/2004 Shen et al.
6,700,935 B2 3/2004 Lee
7,145,946 B2 12/2006 Lee
7,321,621 B2 1/2008 Popescu et al.
7,372,903 B1 5/2008 Lee et al.
7,426,296 B2 9/2008 Lee et al.
7,697,608 B2 4/2010 Lee
7,697,783 B2 4/2010 Lee et al.
7,848,428 B2 12/2010 Chin
8,027,384 B2 9/2011 Lee
8,032,520 B2 10/2011 Dipper et al.
8,213,518 B1 7/2012 Wang et al.
8,218,627 B2 7/2012 Lee
8,218,640 B2 7/2012 Wang
(Continued)

FOREIGN PATENT DOCUMENTS

CN 116630366 A 8/2023
WO 2016033458 A1 3/2016

OTHER PUBLICATIONS

Qiu et al., "CN 116112707 A Video processing method and device, electronic device and storage medium". Date published May 12, 2023.*

(Continued)

*Primary Examiner* — Amir Alavi
(74) *Attorney, Agent, or Firm* — Fish & Richardson P.C.

(57) ABSTRACT

Frame generation super sampling may include generating an image frame embedding from a first image frame in an image stream and predicting a synthetic second image frame in the image stream using the image frame embedding of the first image in the image stream. The synthetic second image is displayed frame after the first image frame in the image stream.

20 Claims, 6 Drawing Sheets

(56) References Cited

U.S. PATENT DOCUMENTS

| | | | |
|---|---|---|---|
| 8,218,641 B2 | 7/2012 | Wang | |
| 8,345,750 B2 | 1/2013 | Lee | |
| 8,711,933 B2 | 4/2014 | Lee | |
| 8,737,485 B2 | 5/2014 | Zhang et al. | |
| 8,879,623 B2 | 11/2014 | Lee | |
| 8,913,664 B2 | 12/2014 | Lee | |
| 9,386,317 B2 | 7/2016 | Lee | |
| 9,872,018 B2 | 1/2018 | Lee | |
| 9,904,866 B1 | 2/2018 | Noble | |
| 10,178,390 B2 | 1/2019 | Lee | |
| 10,210,662 B2 * | 2/2019 | Holzer | G06T 19/006 |
| 10,248,663 B1 | 4/2019 | Keisler et al. | |
| 10,419,760 B2 | 9/2019 | Lee | |
| 11,321,555 B2 * | 5/2022 | Cower | G06T 3/4007 |
| 11,398,060 B2 * | 7/2022 | Takashima | G06T 3/00 |
| 11,501,489 B2 * | 11/2022 | Cao | G06T 17/00 |
| 12,266,144 B2 * | 4/2025 | Mustikovela | G06V 20/56 |
| 2003/0156198 A1 | 8/2003 | Lee | |
| 2004/0086193 A1 | 5/2004 | Kameyama et al. | |
| 2004/0146212 A1 | 7/2004 | Kadono et al. | |
| 2005/0147375 A1 | 7/2005 | Kadono | |
| 2005/0169369 A1 | 8/2005 | Lee | |
| 2005/0169370 A1 | 8/2005 | Lee | |
| 2005/0169371 A1 | 8/2005 | Lee et al. | |
| 2005/0207643 A1 | 9/2005 | Lee et al. | |
| 2005/0265461 A1 | 12/2005 | Raveendran | |
| 2005/0281334 A1 | 12/2005 | Walker et al. | |
| 2007/0025621 A1 | 2/2007 | Lee et al. | |
| 2007/0274396 A1 | 11/2007 | Zhang et al. | |
| 2007/0297505 A1 | 12/2007 | Fidler et al. | |
| 2008/0025397 A1 | 1/2008 | Zhao et al. | |
| 2008/0049844 A1 | 2/2008 | Liu et al. | |
| 2008/0181311 A1 | 7/2008 | Zhang et al. | |
| 2009/0003441 A1 | 1/2009 | Sekiguchi et al. | |
| 2009/0003447 A1 | 1/2009 | Christoffersen et al. | |
| 2009/0003448 A1 | 1/2009 | Sekiguchi et al. | |
| 2010/0150227 A1 | 6/2010 | Lee | |
| 2010/0150228 A1 | 6/2010 | Lee | |
| 2011/0051809 A1 | 3/2011 | Lee | |
| 2011/0122942 A1 | 5/2011 | Kudana et al. | |
| 2012/0033730 A1 | 2/2012 | Lee | |
| 2013/0034169 A1 | 2/2013 | Sadafale et al. | |
| 2013/0072299 A1 | 3/2013 | Lee | |
| 2014/0161172 A1 | 6/2014 | Wang et al. | |
| 2014/0233640 A1 | 8/2014 | Lee | |
| 2015/0016513 A1 | 1/2015 | Lee | |
| 2015/0256736 A1 | 9/2015 | Fukuhara | |
| 2016/0088299 A1 | 3/2016 | Lee | |
| 2016/0094846 A1 | 3/2016 | Lee | |
| 2016/0328643 A1 | 11/2016 | Liu et al. | |
| 2016/0381386 A1 | 12/2016 | Krishnan et al. | |
| 2017/0034538 A1 | 2/2017 | Lee | |
| 2017/0249739 A1 | 8/2017 | Kallenberg et al. | |
| 2017/0255832 A1 | 9/2017 | Jones et al. | |
| 2019/0035113 A1 | 1/2019 | Salvi et al. | |
| 2019/0138889 A1 | 5/2019 | Jiang et al. | |
| 2019/0289321 A1 | 9/2019 | Liu et al. | |
| 2019/0306526 A1 | 10/2019 | Cho et al. | |
| 2019/0325273 A1 | 10/2019 | Kumar | |
| 2020/0081431 A1 | 3/2020 | Weiss | |
| 2021/0042558 A1 | 2/2021 | Choi et al. | |
| 2021/0233328 A1 | 7/2021 | Krishnamurthy et al. | |
| 2022/0284324 A1 * | 9/2022 | Khalatian | G06N 20/00 |
| 2023/0123820 A1 | 4/2023 | Wang et al. | |
| 2023/0237628 A1 | 7/2023 | Gharbi et al. | |
| 2023/0419507 A1 | 12/2023 | Planche et al. | |
| 2025/0209568 A1 * | 6/2025 | Dupeyron | G06F 3/0354 |

OTHER PUBLICATIONS

International Search Report and Written Opinion dated Nov. 7, 2024 for International Patent Application Number PCT/US2024/046919.

ISO/IEC 14496-10:2009, "Information technology—Coding of audio-visual objects—Part 10: Advanced Video Coding, Edition 5" May 13, 2009, Downloaded from the internet: http://www.iso.org/iso/iso_catalogue/catalogue_tc/catalogue_detail.htm?csnumber=52974.

Koutilya et al, "SharinGAN: Combining Synthetic and Real Data for Unsupervised Geometry Estimation"; Published in 2020 IEEE/CVF Conference on Computer Vision and Pattern Recognition (CVPR); Date of Conference: Jun. 13-19, 202; retrieved on [Oct. 27, 2024]; retrieved from the internet entire document.

Liao, J.Y.; Villasenor, J., "Adaptive intra block update for robust transmission of H.263" IEEE Transactions on Circuits and Systems for Video Technology, vol. 10, Issue 1, Date: Feb. 2000, pp. 30-35.

Nageswara Rao, G.; Gupta, P.S.S.K., "Improved Intra Prediction for Efficient Packetization in H.264 with Multiple Slice Groups", 2007 IEEE International Conference on Multimedia and Expo, Date: Jul. 2-5, 2007, pp. 1607-1610.

Nunes, P.; Soares, L.D.; Pereira, F., "Error resilient macroblock rate control for H.264/AVC video coding" 15th IEEE International Conference on Image Processing, 2008. ICIP 2008. Date: Oct. 12-15, 2008, pp. 2132-2135.

Perronnin, Florent, "Output Embedding for Large Scale visual Recognition." CVSPR tutorial: Large Scale Visual Recognition. Jun. 28, 2014.

Ranzato, Marc'Aurelio "Large Scale Visual Recognition Part IV: Deep Learning" Facebook A.I. research Jun. 28, 2014.

Schroff, Florian, et al. "FaceNet: A Unified Embedding for Face Recognition and Clustering." [1503.03832] FaceNet: A Unified Embedding for Face Recognition and Clustering, Jun. 17, 2015.

Simonyan, Karen, and Andrew Zisserman. "Very Deep Convolutional Networks for Large-Scale Image Recognition." [1409.1556] ICANN, Apr. 10, 2015.

Soomro et al., "UCF101: A Dataset of 101 Human Action Classes From Videos in the Wild", Dec. 2012, arXiv.org, , p. 1-7. (Year: 2012).

Su et al., "Exploring Microscopic Fluctuation of Facial Expression for Mood Disorder Classification", Dec. 2017, IEEE, 2017 International Conference of Orange Technologies (ICOT), p. 65-69. (Year: 2017).

Sun et al., "Learning a Convolutional Neural Network for Non-uniform Motion Blur Removal", Jun. 2015, IEEE, 2015 IEEE Conference on Computer Vision and Pattern Recognition (CVPR) p. 796-777. (Year: 2015).

Telecommunication Standardization Sector of ITU, International Telecommunication Union, Apr. 2013.

Vedaldi, Andrea "Input embedding, from shallow to deep" CVPR Tutorial on Large Scale Recognition 2014.

Vetro, A.; Peng Yin; Bede Liu; Huifang Sun, "Reduced spatio-temporal transcoding using an intra refresh technique" IEEE International Symposium on Circuits and Systems, 2002. ISCAS 2002. vol. 4, Date: 2002, pp. IV-723-IV-726 vol. 4.

Wen-Nung Lie; Han-Ching Yeh; Zhi-Wei Gao; Ping-Chang Jui, "Error-Resilience Transcoding of H.264/AVC Compressed Videos" IEEE International Symposium on Circuits and Systems, 2007. ISCAS 2007. Date: May 27-30, 2007, pp. 1509-1512.

Worrall, S.T.; Sadka, A.H.; Sweeney, P.; Kondoz, A.M., "Motion adaptive error resilient encoding for MPEG-4" Proceedings. (ICASSP '01). 2001 IEEE International Conference on Acoustics, Speech, and Signal Processing, 2001. vol. 3, Date: 2001, pp. 1389-1392 vol. 3.

Yu-Kuang Tu*, Jar-Ferr Yang*, and Ming-Ting Sun, An Efficient Criterion for Mode Decision in H.264/AVC, 2006.

Zhang, R.; Regunathan, S.L.; Rose, K., "Video coding with optimal inter/intra-mode switching for packet loss resilience" IEEE Journal on Selected Areas in Communications, vol. 18, Issue 6, Date: Jun. 2000, pp. 966-976.

Zhenyu Wu; Boyce, J.M., "Optimal Frame Selection for H.264/AVC FMO Coding" 2006 IEEE International Conference on Image Processing, Date: Oct. 8-11, 2006, pp. 825-828.

Hochreiter et al., "Long Short-Term Memory," Neural Computation, 1997, 9(8):1735-1780.

Chen et al. "Long-Term Video Interpolation with Bidirectional Predictive Network", Dec. 2017, IEEE, 2017 IEEE Visual Communication and Image Processing (VCIP), p. 1-4 (Year: 2017).

(56) References Cited

OTHER PUBLICATIONS

Liu et al., "Video Frame Synthesis using Deep Voxel Flow", Oct. 2017, IEEE, 2017 IEEE International Conference on Computer Vision (ICCV), p. 4473-4481. (Year: 2017).
Masci, Jonathan, et al. "Stacked Convolutional Auto-Encoders for Hierarchical Feature Extraction." ICANN 2011, 2011, pp. 52-59., doi:10.1007/978-3-642-21735-7_7.
Mikolov, Tomas, et al. "Distributed Representations of Words and Phrases and Their Compositionality." [1310.4546] Distributed Representations of Words and Phrases and Their Compositionality, Oct. 16, 2013.
Songyin Wu et al.: "ExtraSS: A Framework for Joint Spatial Super Sampling and Frame Extrapolation", SA Conference Papers '23, Dec. 12-15, 2023, Sydney, NSW, Australia, © 2023, ACM ISBN 979-8-4007-0315-7/23/12. downloaded from the Internet Dec. 20, 2023, downloaded from.
Villegas et al., "Decomposing Motion and Content for Natural Video Sequence Prediction", Jan. 8, 2018, arXiv.org, , p. 1-22. (Year:2018).
Wang, Zhangyang, et al. "Self-Tuned Deep Super Resolution." [1504.05632] Self-Tuned Deep Super Resolution, Apr. 22, 2015,.
Xue et al. "Visual Dynamics: Probabilistic Future Frame Synthesis via Cross Convolutional Networks", Dce 2016, ACM, NIPS'16: Proceedings of the 30th International Conference on Neural Information Processing Systems, p. 91-99 (Year: 2016).
Guo et al., "ExtraNet: Real-time Extrapolated Rendering for Low-latency Temporal Supersampling," ACM Transactions on Graphics (TOG), Dec 10, 2021, 40(6):1-16.
Srivastava et al., "Unsupervised Learning of Video Representations using LSTMs," CoRR, Submitted on Jan. 4, 2016, arXiv:1502-04681v3, 12 pages.

* cited by examiner

GENERATION SUPER SAMPLING

FIELD OF THE DISCLOSURE

Aspects of the present disclosure relate to super sampling, specifically aspects of the present disclosure relate to frame generation super sampling.

BACKGROUND OF THE DISCLOSURE

Computer graphics systems can generate images from geometric data. Computer graphics systems are commonly used in graphic-intensive applications such as video games. Recently, artificial intelligence (AI) has been applied to real-time rendering of graphics to construct sharp, higher resolution images. For example, Nvidia's Deep learning Super Sampling (DLSS) 3 implementation inserts a synthetic frame generated by a machine learning model between the last GPU-rendered fame and the one before that prior to display. This creates a lot of latency because the device must render the last frame and the prior frame and still results in variable frame rate even if it creates higher frame rates. Changes in the variable frame rate are very noticeable for users and is sometimes referred to as "hitching." These changes in variable frame rate degrade the user experience as the user may experience frame rate slow-down in processing intensive application states while experiencing higher frame rates in low intensity processing tasks.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Figure 1A:
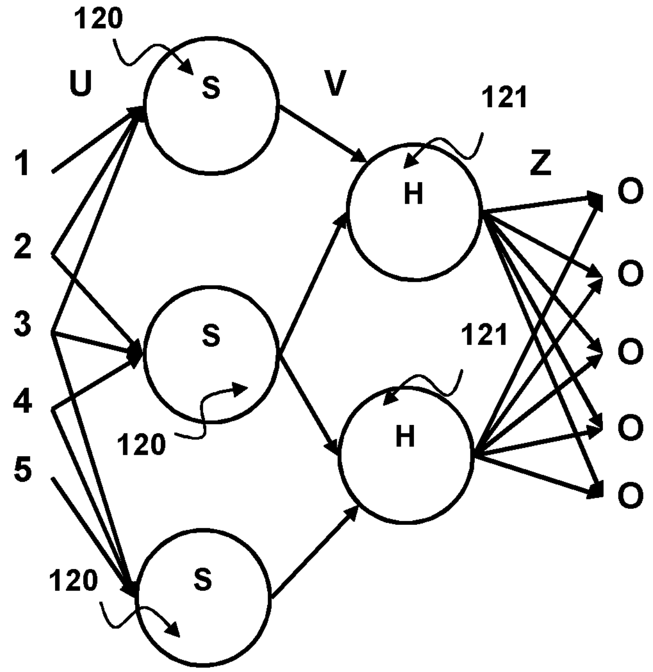
FIG. 1A is a simplified node diagram of a recurrent neural network for improved frame generation super sampling according to aspects of the present disclosure.

Although the following detailed description contains many specific details for the purposes of illustration, anyone of ordinary skill in the art will appreciate that many variations and alterations to the following details are within the scope of the disclosure. Accordingly, examples of embodiments of the disclosure described below are set forth without any loss of generality to, and without imposing limitations upon, the claimed disclosure.

A computer graphics system typically renders a frame as fast as computing power and software allows. With variable frame rate, monitor and computer can get out of synch causing a visual artifact known as "tearing". In monitors with V-sync or similar capability connected to a computer, the monitor can tell the computer when it will render a frame or vice versa. Alternatively, the computer can render two real frames and artificially render an intermediate frame between them, e.g., using motion vectors. This is called variable render rate (VRR) rendering. VRR still has an issue with application latency as the render rate is hemmed by the creation speed of the last real frame. VRR does avoid screen tearing, but the result is not as good as rendering with a fixed frame rate and is quite noticeable to the user during render rate changes. To reach a fixed frame rate, systems are configured to reduce the overall rendering quality until you can reach the target fixed rate for both processing more intensive frames and less processing intensive frames.

According to aspects of the present disclosure, a computer graphics system may operate at a real fixed frame rate and generate one or more synthetic frames after each real frame or after each two or more real frames according to a synthetic frame insertion interval. Synthetic frames may be generated from the prior two real frames using algorithmic frame generation or neural network models trained with a machine learning algorithm to predict synthetic frames. A subsequent frame may be generated after the synthetic frame and then displayed. In some alternative implementations the synthetic frame may be created using a last frame and motion vectors generated from images in an image stream. This improved frame generation may be unconstrained by the generation speed of the last real frame as the synthetic frames are generated after the last real frame and before creation of a subsequent real frame.

General Neural Network Training

According to aspects of the present disclosure, improved frame generation for super sampling may be implemented with an autoencoder type neural network layout having encoder networks which take part in dimensional reduction outputting image frame embeddings and a decoder which predicts a synthetic subsequent frame using the image frame embeddings collectively referred to as an auto-encoder neural network. The auto-encoder neural network outputs feature length image embeddings and the decoder includes a neural network for recognition that uses those feature length image embeddings to generate one or more synthetic next frames. The auto-encoder may also be configured to take motion vector and/or user input information. The motion vector and/or user input information may be used in conjunction with the frame data to generate the image embeddings.

Each neural network used in the autoencoder may be any type known in the art but preferably the neural network is a Convolutional Neural Network (CNN). In an alternative embodiment the CNN is a Convolutional Recurrent Neural Network (CRNN) of any type.

FIG. 1A depicts the basic form of a CNN having a layer of nodes 120, each of which is characterized by an activation function S, one input weight U, and an output transition weight V. It should be noted that the activation function S may be any non-linear function known in the art and is not limited to the (hyperbolic tangent (tanh) function. The input weight U and output transition weights V may be random before training and altered during training based on a selected machine learning algorithm. For example, the activation function S may be a Sigmoid or ReLu function. A feature of CNNs is the addition of hidden layers 121 to the output of a first node layer 120 creating a hierarchical type structure. A CNN may have any number of hidden layers and the hidden layers may have different activation function H and output transition weight Z than the initial node layer 120. The inputs to the initial node layer 1, 2, 3, 4, 5, may be monochromatic be pixel values from an input image frame. There may be an input layer for each color channel (e.g. for Red Green Blue color mix there may be 3 input layers one for each color channel) of the image as discussed below. Other inputs such as user inputs to an input device may be concatenated to the input space of one or more of the color channels or a separate input layer may be created for that other input type. Additionally, the initial node layer 120 in a CNN is not fully connected across all inputs and instead operates on a window of inputs as discussed in FIG. 1C. Operating on only a window of inputs allows the CNN to better maintain spatial information than a traditional fully connected NN. Later hidden layers may combine outputs from all nodes in a window of the previous layer; this type of layer is known as a pooling layer. A max pooling layer is another specialized hidden layer similar to a pooling layer except it only values the highest weighted input from the previous layer within a window. The design of CNNs is highly dependent on the purpose for which is chosen and the number of nodes, layers, layer types and activation functions are variable and require optimization through experimentation.

Figure 1B:
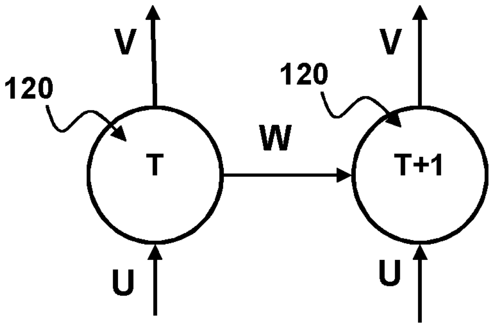
FIG. 1B is a simplified node diagram of an unfolded recurrent neural network for improved frame generation super sampling according to aspects of the present disclosure.

As shown in FIG. 1B a recurrent neural network layer adds a recurrent node transition W which returns the value from the previous iteration to the current node. Thus, a recurrent layer may be considered as a series of nodes 120 having the same activation function moving through time T and T+1. Thus, the RNN maintains historical information by feeding the result from a previous time T to a current time T+1. A CNN may implement node layers of the recurrent type. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997)

Figure 1C:
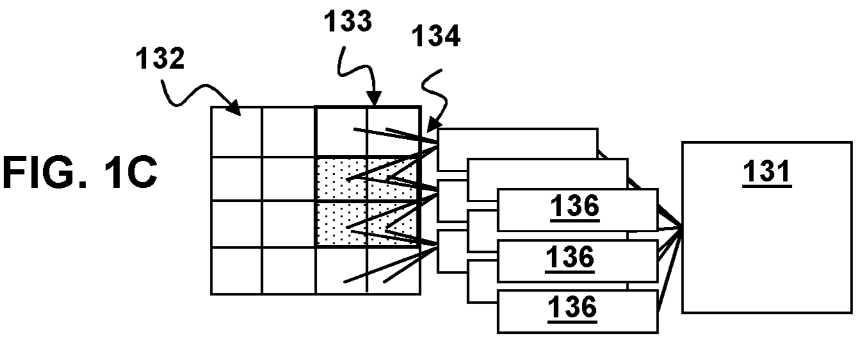
FIG. 1C is a simplified diagram of a convolutional neural network for improved frame generation super sampling according to aspects of the present disclosure.

FIG. 1C depicts an example layout of a convolution neural network for image recognition. In this depiction the convolution neural network is generated for an image 132 with a size of 4 units in height and 4 units in width giving a total area of 16 units. The depicted convolutional neural network has a filter 133 size of 2 units in height and 2 units in width with a skip value of 1 and a channel 136 size of 9. (For clarity in depiction only the connections 134 between the first column of channels and their filter windows is depicted.) The convolutional neural network according to aspects of the present disclosure may have any number of additional neural network node layers 131 and may include such layer types as additional convolutional layers, fully connected layers, pooling layers, max pooling layers, local contrast normalization layers, etc. of any size.

Autoencoder Training

Figure 2:
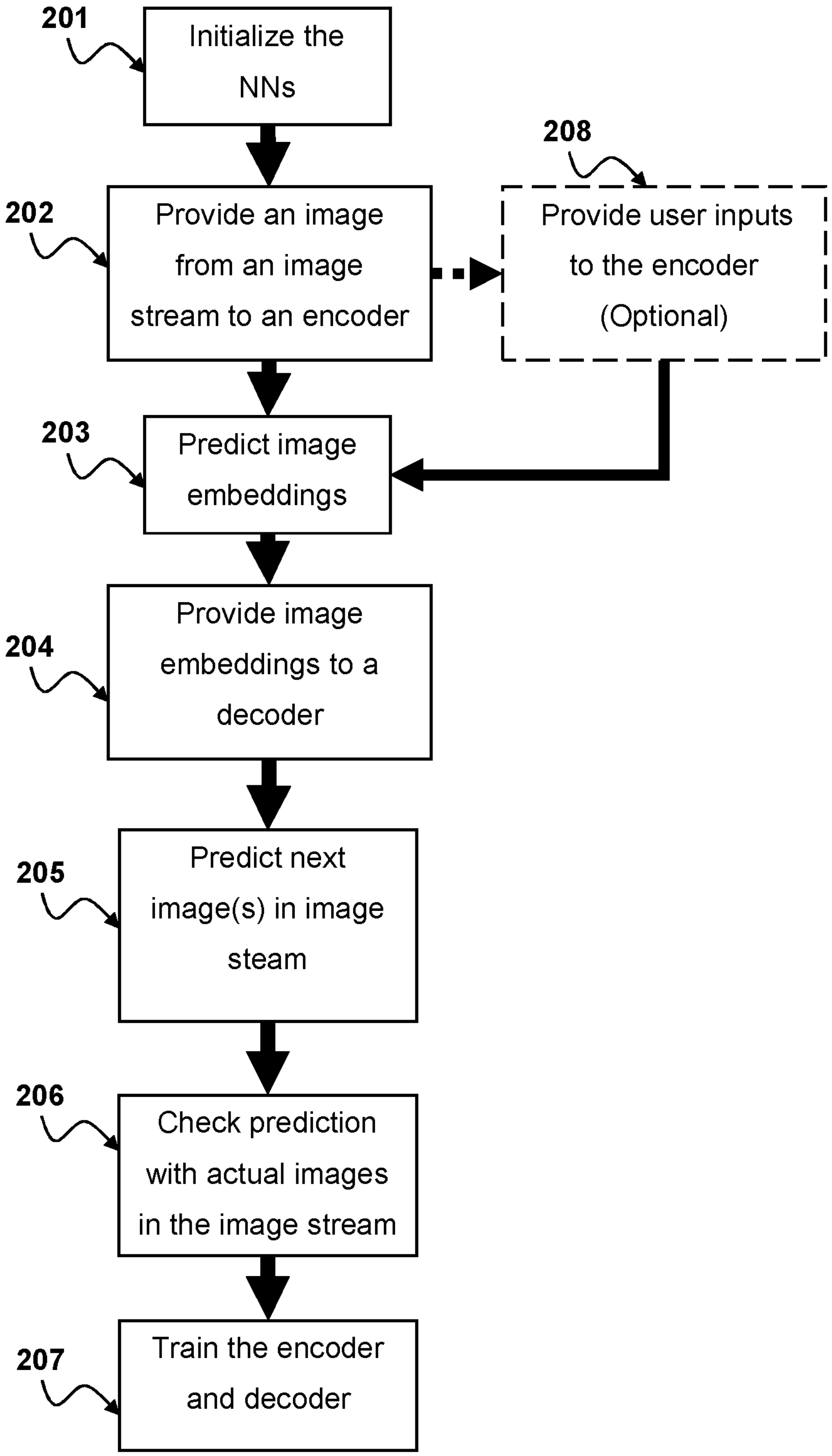
FIG. 2 is a flow diagram showing a method for training an auto-encoder network to generate synthetic image frames for improved frame generation super sampling according to aspects of the present disclosure.

FIG. 2 shows a method for training an auto-encoder network to generate synthetic image frames.

Training a neural network (NN) begins with initialization 201 of the weights of the NN (shown as U and V in FIG. 1A). The initial weights depend on the type of activation function and number of inputs to the node. The initial weights for an NN cannot be 0 because that would result in asymmetric calculations in the hidden layers. In general, the initial weights should be distributed randomly. For example, an NN with a tanh activation function should have random values distributed between $$-\frac{1}{\sqrt{n}} \text{ and } \frac{1}{\sqrt{n}}$$

where n is the number of inputs to the node.

After initialization an image frame from an image stream is provided to an encoder neural network 202. Exemplary image stream types are without limitation: video streams, time lapse photography, slow motion photography etc. In some implementations, motion vectors may be provided with the image frame. Motion vector data may be concatenated to the end of the image frames or provided to a separate network which generates a motion embedding. The motion embeddings may be concatenated to the image frames embeddings. Alternatively, two or more images may be provided to the encoder neural network. These images may be concatenated together and used as a single array in the input space of the encoder. The two or more images may include a last image frame generated by the renderer and one or more image frame previous to the last image frame generated by the device.

In some optional implementations user inputs are also provided to the encoder neural network 208. The user inputs may be concatenated to the image frames in the encoder input space. Alternatively, a separate user input network may generate user input embeddings and the user input embeddings may be concatenated with image frame embeddings and used as inputs to the decoder.

An auto-encoder includes a neural network trained using a method called unsupervised learning. In unsupervised learning an encoder NN is provided with a decoder NN counterpart, and the encoder and decoder are trained together as a single unit. The basic function of an auto-encoder is to take an input x which is an element of $R^d$ and map it to a representation h which is an element $R^{d'}$ this mapped representation may also be referred to as the image vector. A deterministic function of the type $h=f_\theta=\sigma(W_\chi+b)$ with the parameters $\theta=\{W, b\}$ is used to create the image vector. A decoder NN is then employed to reconstruct the input from the representative image vector by a reverse of $f{:}y=f_{\theta'}(h)=\sigma(W'h+b')$ with $\theta'=\{W', b'\}$ the two parameters' sets may be constrained to the form of W'=WT using the same weights for encoding the input and decoding the representation. Each training input $\chi_i$ is mapped to its image vector $h_i$ and its reconstruction $y_i$. These parameters are trained by minimizing an appropriate cost function over a training set. A convolutional auto encoder works similar to a basic auto-encoder except that the weights are shared across all of the locations of the inputs. Thus, for a mono channel input (such as a black and white image) x, the representation of the k-th feature map is given by $h^k=\sigma(x*W^k+b^k)$ where the bias is broadcasted to the whole map. Variable $\sigma$ represents an activation function, b represents a single bias which is used per latent map, W represents a weight shared across the map, and * is a 2D convolution operator. To reconstruct the input the formula is $$y = \sigma\left(\sum_{k \in H} h^k * \tilde{W}^k + C\right)$$

Where there is one bias C per input channel, h identifies the group of feature maps and Ŵ identifies the flip operation over both dimensions and weights. Further information about training and weighting of a convolutional auto encoder can be found in Masci et al. "Stacked Convolutional Auto-Encoders for Hierarchical Feature Extraction" In *ICANN*, pages 52-59. 2011.

As discussed above the auto encoder maps an input $x_i$ to its corresponding representative image embedding $h_i$ 203 those image embeddings are then provided to a decoder 204. According to aspects of the present disclosure the encoder and decoder are configured to predict the one or more next frames in the input image stream 205 instead of reconstructing the original input. The output of the decoder according to aspects of the present disclosure is modified from the traditional auto-encoder case by having the network output more channels than it was input. By way of example and not by way of limitation if an RGB 3 channel image of size 100×100 was input the output would be a b×3×100×100 where b in the number of channels corresponding to all the timestamps in the interval {t+w}. That is, given an input image F at time t the encoder and decoder is trained to predict the images in the interval $F_{\{t+w\}}$ where w is a prediction interval. In other words, the training ideal would be to minimize the mean squared error between a synthetic subsequent image $F'_{t+w}$ and the actual subsequent image $F_{t+w}$ in an image stream $\{F_1, F_2, F_3 \ldots F_T\}$ respectively giving the equation:

$$\frac{1}{T}\sum_{t=1}^{T}(F'_{t+w} - F_{t+w})^2 \quad \text{EQ. 1}$$

Thus, according to aspects of the present disclosure the encoder NN, ε, generates a k-dimensional vector Φ such that $\Phi=\varepsilon(F_t)$ and the decoder D generates predicted subsequent images $F_{t+w}$ from the k-th dimensional vector Φ giving:

$$\{Ft_{+w}\} = D(\Phi) = D(\varepsilon(F_t)) \quad \text{EQ. 2}$$

Where the decoder is a convolution network with up sampling layers that converts the k-dimensional vector Φ to the output image sequence. Training and optimization of this decoder and encoder neural network system takes advantage of the fact that the training set is an image stream and as such the previous and subsequent images are readily available. The outputs of the decoder, i.e., the predicted subsequent images are compared with the corresponding actual subsequent images from the image stream 206. In other words, the predicted image $F'_{t+w}$ is compared to actual image at time t+w. The difference between the actual image and the predicted image is applied to a loss function such as a mean squared error function, cross entropy loss function etc. The NN is then optimized and trained, as indicated at 207, using the result of the loss function and using known methods of training for neural networks such as backpropagation with stochastic gradient descent.

After many rounds of training the encoder and decoder neural network output correctly predicts subsequent images in an image stream and the loss function has stabilized.

In some embodiments the predictions are not limited to an immediate next image in the image stream. The decoder system may be trained to predict any number of images before or after the input image. In some alternative embodiments the input to the encoder and decoder NN may be optimized by selecting certain image points for the NNs to work on or encoding the video using conventional video encoding methods such as, MPEG-2 encoding or H.264 encoding. According to additional aspects of the present disclosure additional tuning of the encoder and decoder system may be carried out by hand manipulation of the number of nodes in a layer or by changing the activation function. Tuning of a convolutional NN may also be performed by changing the weights of certain mask, the sizes of the masks and the number of channels. In fully connected networks the number of hidden units could be changed to tune the network.

Figure 3:
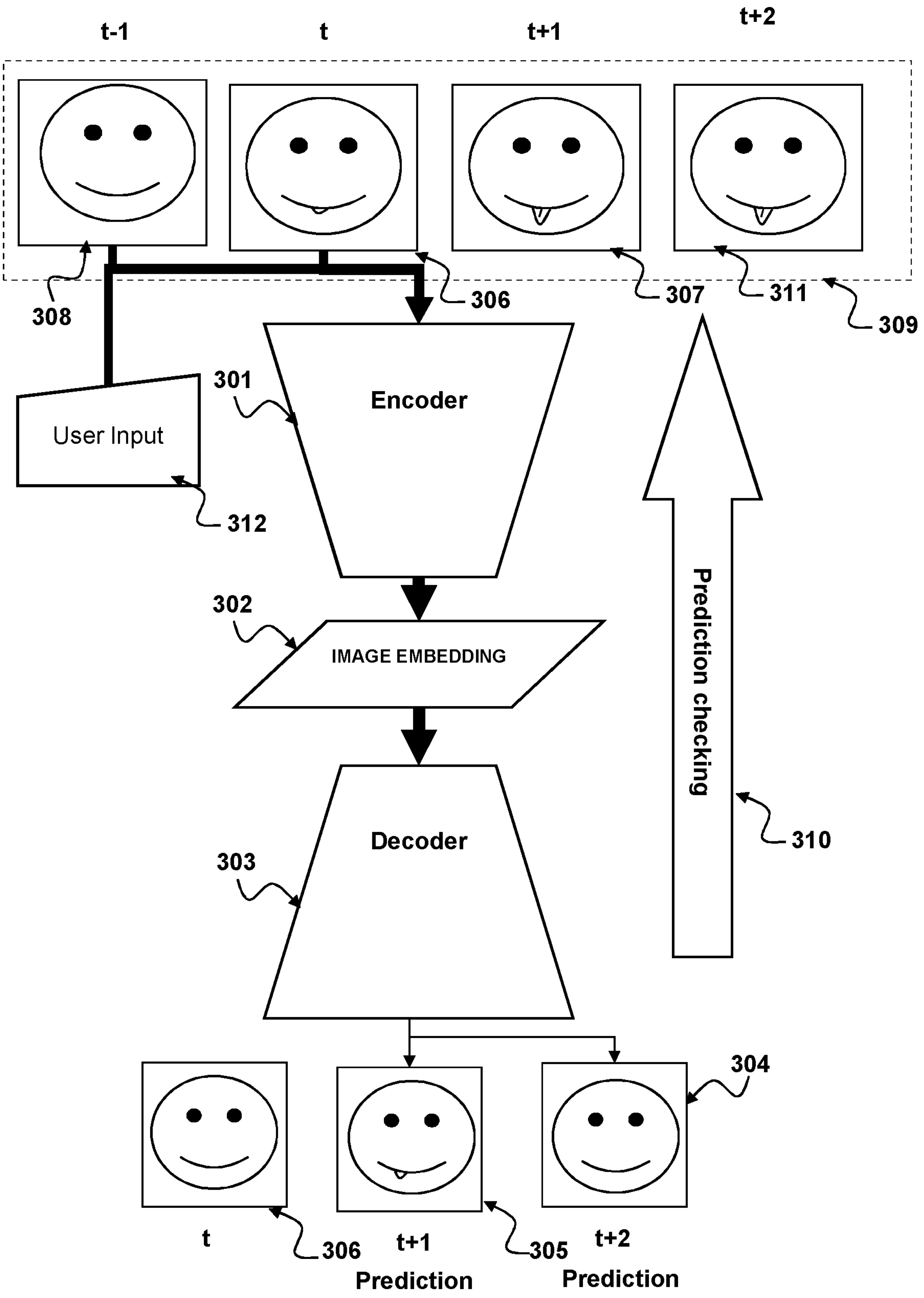
FIG. 3 depicts a block diagram of the encoder-decoder pair being trained via unsupervised training according to aspects of the present disclosure.

FIG. 3 depicts a block diagram of the encoder 301 that is trained via unsupervised training with a decoder 303. The encoder is provided, an input last image 306 and, in this implementation, a previous image 308 from an image stream 309. The image stream 309 contains previous images 308 and/or subsequent images T+1 307 and T+2 311. Additionally in this implementation a user input 312 to an input device is appended to the encoder inputs. The user input here may be made contemporaneously (e.g., within 15 ms) with the generation of the input last image or shortly before (e.g. greater than 15 ms display but less than two seconds before) the last image frame is generated. The idea being that the user input is tied to generation of the image frame; e.g., when a player in a game presses the jump button, the next few frames will be jump animation frames which can be learned by the encoder. The user input may be one or more button presses, or movement information from the input device, the input device may be a game controller, keyboard, mouse, trackball, joystick, Inertial Measurement Unit (IMU), etc. The user input may be a single input or combination of inputs made by the user. The combination of inputs may be determined by a threshold time between inputs, if the user makes another input before the threshold time period has elapsed the input may be entered as an element in the combination of inputs. In some alternative implementations instead of including a previous image, motion vectors for the input last image may be provided as an input.

As discussed above the encoder 301 generates a representative image embedding 302 which is provided to the decoder 303. The decoder 303 then constructs a synthetic next image $F_{t+1}$ 305 from the representative image embedding 302 and in some implementations the decoder may also predict synthetic second next image $F_{t+2}$ 304. The predictions of a synthetic next image 305, and (optionally) a synthetic second next image 304 are checked through comparison 310 with the actual next image 307 and optionally original second next image 309 respectively. As shown the predicted subsequent image 305 differs from the actual subsequent image 307 as the face is sticking out its tongue in the actual image but is not in the predicted image therefore more training would be needed to reach a correct result. The result of the comparison is then used for training and optimization of the encoder decoder system as described above. The encoder decoder system is considered to be fully trained when the loss function does not change very much with variation in parameters.

Once trained the encoder-decoder pair may be used to output a synthetic image frame that may be displayed after a last image frame generated by the system in an image stream. For example, and without limitation, the system may generate a previous real image frame and a first real image frame and then implement the encoder-decoder pair to generate a synthetic second image and (optionally) a synthetic third image. The synthetic second image may be displayed after the first real image and before generation of a second real image by the system Here generation of the real images includes the use of one or more stages in the traditional graphics processing pipeline such as primitive generation, graphics processing pipeline steps such as input assembly, vertex shading, hull shading, tessellation, domain shading, geometry shading, rasterization, and pixel shading. Whereas in aspects of the present disclosure synthetic images are generated by machine learning or algorithmically without use of stages in the traditional graphics processing pipeline.

Autoencoder Based Improved Frame Generation Super Sampling

Figure 4:
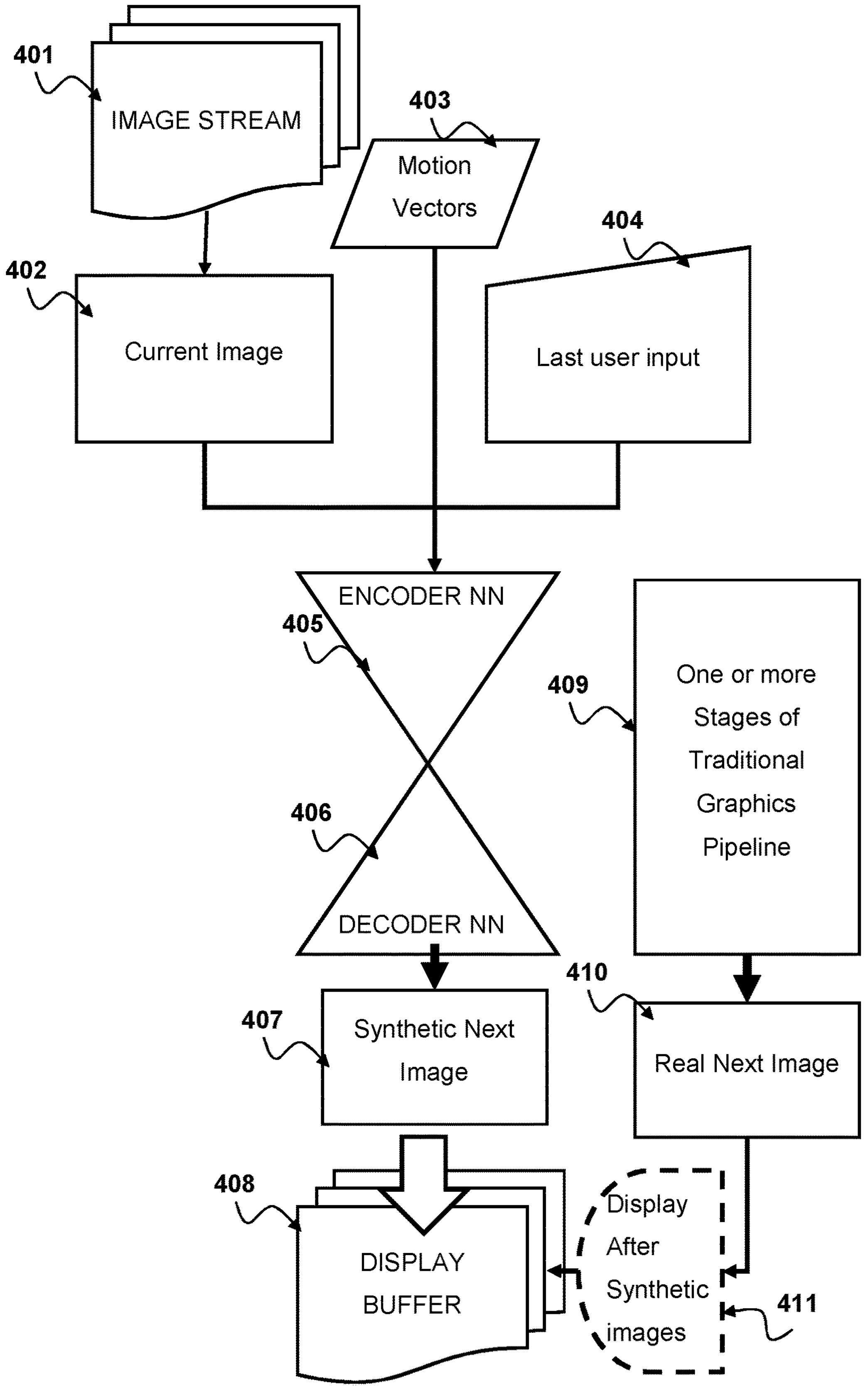
FIG. 4 graphically depicts the improved frame generation super sampling method using an autoencoder trained with a machine learning algorithm according to aspects of the present disclosure.

FIG. 4 graphically depicts the improved frame generation super sampling method using an autoencoder trained with a machine learning algorithm according to aspects of the present disclosure. In the implementation shown the trained encoder neural network 405 is provided with a real first image frame 402 from an image stream generated by the system using one or more stages of a traditional graphics pipeline. Additionally, the encoder neural network is provided with motion vectors 403 generated from the first real image frame and the image stream. Each image frame is composed of an array of pixels, these pixels may be grouped together in for example and without limitation 4-pixel by 4-pixel (16 Pixels total) blocks and further grouped into 16-pixels by 16-pixel macro blocks (a 4×4 block square). Additionally, a sub macro block grouping may be for example and without limitation a 2-block by 2-block group. Motion vectors may be created by searching the pictures in the image stream for matching blocks or macroblocks and generating a vector value based on the shift of the matching blocks in the image.

Finally, the last user input to an input device 404 may (optionally) be provided to the encoder NN 405. As discussed above the last user input to the input device may be made contemporaneously with the generation of the input last image or shortly before the last image frame is generated. The encoder NN 405 is trained with a machine learning algorithm as discussed with FIG. 2 and FIG. 3 to generate an image embedding. The decoder NN 406 is closely tied with the encoder NN 405 and takes the image embedding and predicts a synthetic second image 407 the synthetic second image is the image that comes after the first image in the image stream or an image in between the real first image and real second image 410 but the real second image has not been generated by the graphics pipeline yet 409. In some implementations the decoder NN may generate one or more additional synthetic images from the image embedding. These additional images may be displayed before the real next image. After displaying the one or more synthetic next images the real next image 410 may be displayed. The real next image 410 may be generated by one or more stages of a graphics pipeline 409 while one or more of the synthetic next images are being generated or after the one or more synthetic next images have been generated. Generally, generation of the real next image will take longer than generation of synthetic images using the Auto-encoder NNs. In some (optional) implementations display of the real next image may be delayed 411 until the one or more synthetic next images have been displayed. This may prevent injection of the real next image between two synthetic images.

Figure 5:
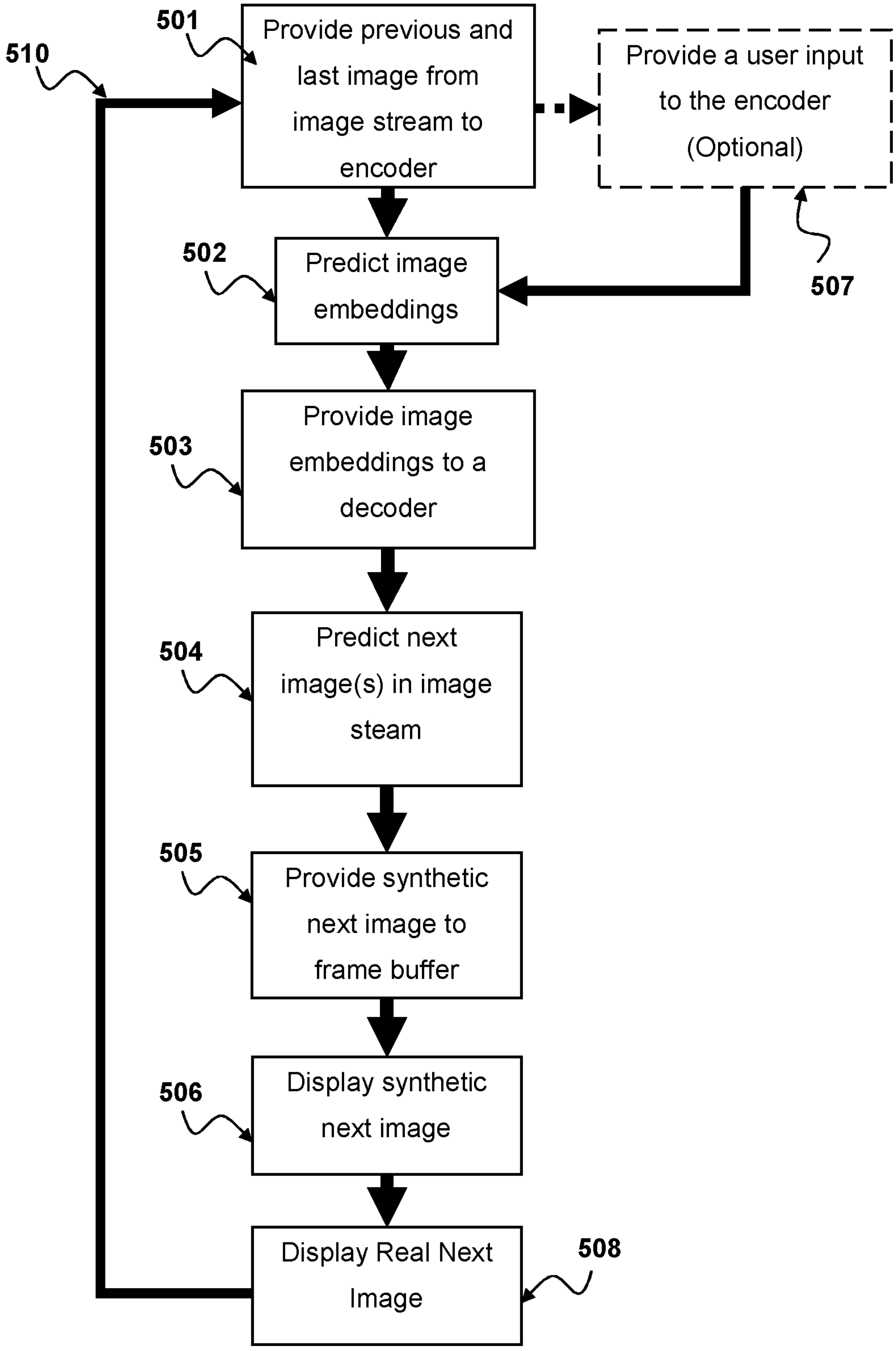
FIG. 5 is a flow diagram showing a method for improved frame generation super sampling according to aspects of the present disclosure.

FIG. 5 is a flow diagram showing a method for improved frame generation super sampling according to aspects of the present disclosure. In this implementation a real previous image frame and a real last image frame generated by one or more stages of the graphics pipeline may be provided to the encoder NN 501. Optionally one or more last user inputs to an input device may also be provided to the encoder NN 507. The encoder NN then generates image frame embeddings from the real previous image frame and a real last image frame and optionally the one or more last user inputs 502. The image frame embeddings are then provided to the trained decoder NN 503. The trained decoded NN predicts one or more synthetic next image frames from the image frame embeddings 504. The synthetic next image is then provided to the frame buffer 505 where it may be provided to a display device and the synthetic next image frame may be displayed on the screen of the display device 506. After the one or more synthetic next image frames are displayed a real next image frame generated by one or more stages of the graphics pipeline may be displayed 508. In some alternative implementations the pixel values of the synthetic next image frame may be checked against the pixel values of the real next image frame and if they match or if the difference between the pixel values falls below a threshold the real next image frame may not be displayed. The real next image frame may also be provided 510 as input to the encoder NN as the real last image 501 to continue the cycle of synthetic frame generation.

Algorithmic Frame Generation

Algorithmic Frame Generation uses an algorithm instead of machine learning and neural networks to generate a synthetic frame. According to aspects of the present disclosure, the Algorithmic frame generation may use either motion vectors or a real previous frame with the real last frame. Using the real previous frame, the system may identify blocks or macroblocks within the image that have not changed between the real previous frame and the real last frame. The unchanged macroblocks may be passed to the synthetic image without change.

Next the system may identify motion between the real previous frame and the real last frame by searching the real last frame for blocks or macro blocks or sub macroblocks that match the real previous frame, this is sometimes referred to as motion search. The magnitude and direction of the shift in matching block or macro block or sub macroblock may then be used to predict the location of the matching block or macro block or sub macroblock in the synthetic next image frame based on the assumption that movement will generally continue in the direction and magnitude of the motion vector in the short time between frames. In some implementations the motion vectors may already be computed and in which case no additional motion search is required.

Once the location of the matching block or macro block or sub macroblock has been determined, pixel values in the determined location may be overwritten with values of the matching block or macro block or sub macroblock. In areas where the matching block or macro block or sub macroblock leaves a space, values may be copied from the real previous image if the matching block or macro block or sub macroblock was not in the area, or the values may be copied from the nearest neighboring pixel values.

System for Improve Frame Generation Super Sampling

Figure 6:
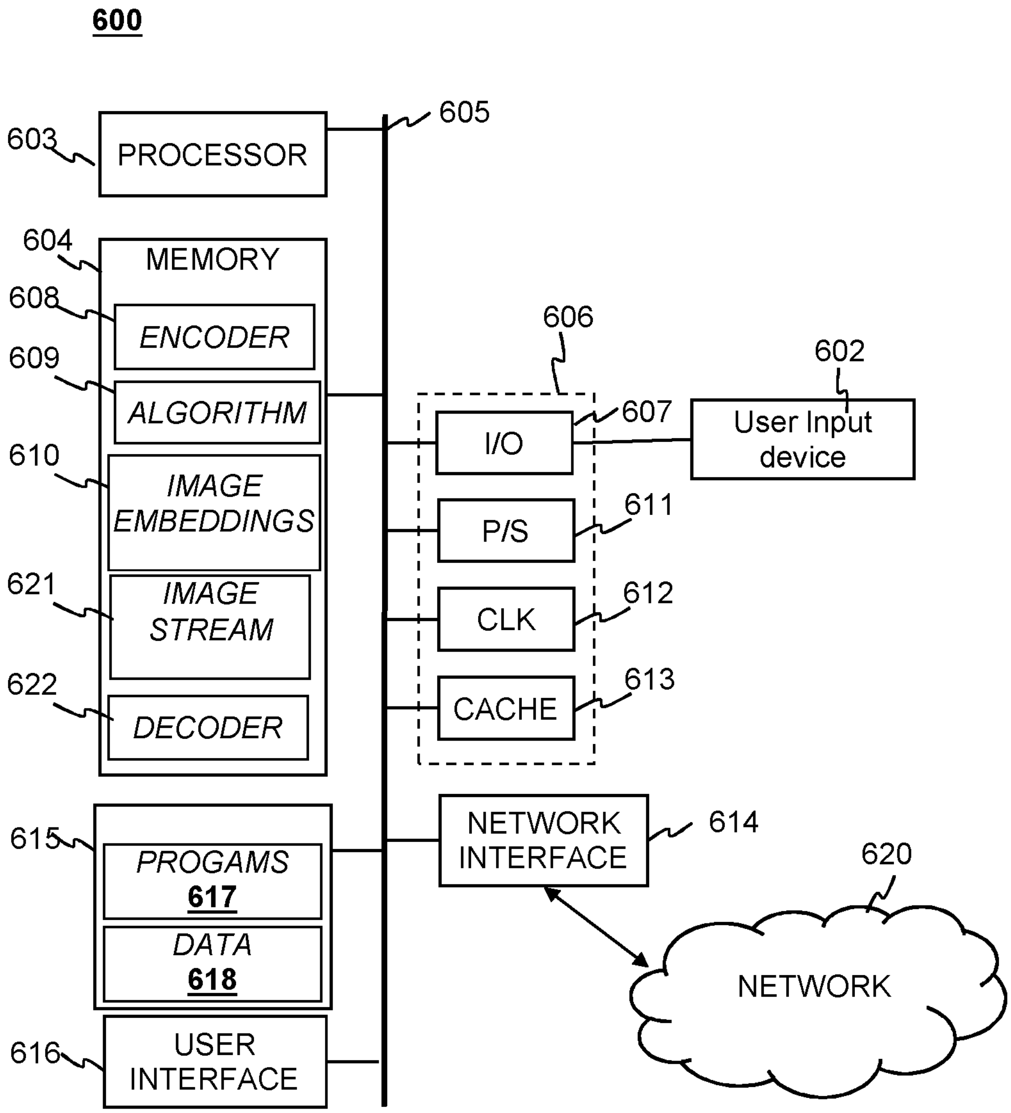
FIG. 6 depicts a system for improved frame generation super sampling according to aspects of the present disclosure.

FIG. 6 depicts a system according to aspects of the present disclosure. The system may include a computing device 600 coupled to a user input device 602. The user input device 602 may be a controller, touch screen, microphone, keyboard, mouse, Joystick, Motion control device (IMU) or other device that allows the user to input speech data into the system.

The computing device 600 may include one or more processor units 603, which may be configured according to well-known architectures, such as, e.g., single-core, dual-core, quad-core, multi-core, processor-coprocessor, cell processor, and the like. The computing device may also include one or more memory units 604 (e.g., random access memory (RAM), dynamic random-access memory (DRAM), read-only memory (ROM), and the like).

The processor unit 603 may execute one or more programs, portions of which may be stored in the memory 604 and the processor 603 may be operatively coupled to the memory, e.g., by accessing the memory via a data bus 605. The programs may be configured to implement training of an Encoder 608 and a Decoder 622. The Memory 604 may also contain software modules such as an Encoder Module 608, Decoder Module 622, and/or Algorithmic Frame Generation Module 609. The Algorithmic Frame Generation Module may generate frames using motion vectors which may be generated from the image stream 621 as discussed above. The overall structure and probabilities of the NNs may also be stored as data 618 in the Mass Store 615. The processor unit 603 is further configured to execute one or more programs 617 stored in the mass store 615 or in memory 604 which cause processor to carry out the method 200 of training the Encoder 608 and Decoder 622 from an image stream 621 and/or the training an image recognition NN from image embeddings 610. The system may generate Neural Networks as part of the NN training process. These Neural Networks may be stored in memory 604 as part of the Encoder Module 608, Decoder Module 622. Completed NNs may be stored in memory 604 or as data 618 in the mass store 615. The programs 617 (or portions thereof) may also be configured, e.g., by appropriate programming, to encode, un-encoded video or manipulate one or more images in an image stream stored in a buffer in the memory 604.

The computing device 600 may also include well-known support circuits, such as input/output (I/O) 607, circuits, power supplies (P/S) 611, a clock (CLK) 612, and cache 613, which may communicate with other components of the system, e.g., via the data bus 605. The computing device may include a network interface 614. The processor unit 603 and network interface 614 may be configured to implement a local area network (LAN) or personal area network (PAN), via a suitable network protocol, e.g., Bluetooth, for a PAN. The computing device may optionally include a mass storage device 615 such as a disk drive, CD-ROM drive, tape drive, flash memory, or the like, and the mass storage device may store programs and/or data. The computing device may also include a user interface 616 to facilitate interaction between the system and a user. The user interface may include a display device, e.g., a monitor, flat screen, or other audio-visual device.

The network interface 614 to facilitate communication via an electronic communications network 620. The network interface 614 may be configured to implement wired or wireless communication over local area networks and wide area networks such as the Internet. The device 600 may send and receive data and/or requests for files via one or more message packets over the network 620. Message packets sent over the network 620 may temporarily be stored in a buffer in memory 604.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for frame generation super sampling, comprising:

generating a first image frame embedding from a first image frame in an image stream;

before generating a second image frame embedding from a second image in the image stream, predicting a synthetic image frame in the image stream using the first image frame embedding of the first image frame in the image stream;

displaying the synthetic image frame after the first image frame in the image stream; and after displaying the synthetic image frame, displaying the second image frame in the image stream.

2. The method of claim 1, wherein generating the first image frame embedding comprises generating the first image frame embedding with user input information.

3. The method of claim 2, wherein the user input information includes one or more button presses of an input device.

4. The method of claim 2, wherein the user input information includes one or more movements of an input device.

5. The method of claim 4, wherein the input device is a mouse or trackball or joystick.

6. The method of claim 4, wherein the input device is an inertial measurement unit.

7. The method of claim 1, wherein generating the first image frame embedding comprises generating the first image frame embedding with motion vectors from the image stream.

8. The method of claim 1, wherein generating the first image frame embedding from the first image frame in the image stream comprises generating the first image frame embedding in conjunction with a previous image frame in the image stream.

9. The method of claim 1, wherein generating the first image frame embedding includes using a neural network trained with a machine learning algorithm.

10. The method of claim 1, wherein predicting the synthetic image frame in the image stream using the first image frame embedding includes using a neural network trained with a machine learning algorithm.

11. The method of claim 1, further comprising:

predicting another synthetic image frame using the first image frame embedding; and displaying the other synthetic image frame after displaying the synthetic image frame in the image stream.

12. The method of claim 11, further comprising displaying a third image frame after displaying the other synthetic image frame.

13. The method of claim 1, comprising:

using the first and second image frames, determining motion vectors between a matching block in the first and second image frames; and using the motion vectors, predicting a location of the matching block in a second synthetic image.

14. A system for frame generation super sampling, comprising:

a processor;

a memory operatively coupled to the processor;

non-transitory processor executable instructions embodied in the memory, the non-transitory processor executable instructions when executed by the processor cause the processor to carry out a method for frame generation super sampling comprising:

generating a first image frame embedding from a first image frame in an image stream;

before generating a second image frame embedding from a second image in the image stream, predicting a synthetic image frame in the image stream using the first image frame embedding of the first image frame in the image stream;

displaying the synthetic image frame after the first image frame in the image stream; and after displaying the synthetic image frame, displaying the second image frame in the image stream.

15. The system of claim 14, further comprising an input device, wherein generating the first image frame embedding from the first image frame in the image stream uses user input information.

16. The system of claim 15, wherein the user input information includes one or more button presses of the input device.

17. The system of claim 16, wherein the user input information includes one or more movements of the input device.

18. The system of claim 17, wherein the input device is a mouse or trackball or joystick.

19. The system of claim 17, wherein the input device is an inertial measurement unit.

20. A non-transitory computer readable medium having computer executable instructions embedded thereon, the computer executable instructions when executed by a computer cause the computer to implement a method for frame generation super sampling comprising:

generating a first image frame embedding from a first image frame in an image stream;

before generating a second image frame embedding from a second image in the image stream, predicting a synthetic image frame in the image stream using the first image frame embedding of the first image frame in the image stream;

displaying the synthetic image frame after the first image frame in the image stream; and after displaying the synthetic image frame, displaying the second image frame in the image stream.

* * * * *